United States Patent
Strunk (10) Patent No.: US 8,520,661 B2
(45) Date of Patent: Aug. 27, 2013

(54) SYSTEM AND METHOD FOR VOICE OVER INTERNET PROTOCOL

(75) Inventor: Jeffrey L. Strunk, Eustis, ME (US)

(73) Assignee: Flatwire, Inc., Eustis, ME (US)

( * ) Notice: Subject to any disclaimer, the term of this patent is extended or adjusted under 35 U.S.C. 154(b) by 1555 days.

(21) Appl. No.: 11/313,189

(22) Filed: Dec. 20, 2005

(65) Prior Publication Data
US 2007/0140221 A1 Jun. 21, 2007

(51) Int. Cl.
H04L 12/66 (2006.01)
H04M 1/64 (2006.01)
G06F 13/00 (2006.01)
G06F 15/16 (2006.01)

(52) U.S. Cl.
USPC ......... 370/352; 709/206; 710/303; 379/88.17

(58) Field of Classification Search
USPC .................. 370/352, 395.31; 379/88.16–18, 379/219; 709/206; 710/303
See application file for complete search history.

(56) References Cited

U.S. PATENT DOCUMENTS

| 6,785,653 | B1 | 8/2004 | White et al. |
| 7,289,486 | B2 * | 10/2007 | Yeom ............................ 370/352 |
| 7,492,879 | B1 * | 2/2009 | Beene et al. ............. 379/114.02 |
| 7,668,302 | B1 * | 2/2010 | Beene et al. ............. 379/114.02 |
| 8,175,939 | B2 * | 5/2012 | Howe et al. ...................... 705/35 |
| 2002/0077956 | A1 * | 6/2002 | Solheim .......................... 705/37 |
| 2002/0194069 | A1 * | 12/2002 | Thakur et al. ................... 705/14 |
| 2002/0194414 | A1 * | 12/2002 | Bateman et al. .............. 710/303 |
| 2003/0090516 | A1 * | 5/2003 | Stein .............................. 345/745 |
| 2004/0098595 | A1 * | 5/2004 | Aupperle et al. ............. 713/185 |
| 2004/0109461 | A1 | 6/2004 | Suzuki et al. |
| 2004/0120312 | A1 * | 6/2004 | Yeom ............................ 370/352 |
| 2004/0160946 | A1 * | 8/2004 | Fowler ........................... 370/352 |
| 2005/0074109 | A1 * | 4/2005 | Hanson et al. ............. 379/207.04 |
| 2005/0207560 | A1 * | 9/2005 | Speight .................... 379/266.07 |
| 2005/0220083 | A1 | 10/2005 | Takeuchi |
| 2005/0261010 | A1 * | 11/2005 | Anglero ........................ 455/466 |
| 2006/0074760 | A1 * | 4/2006 | Helin et al. ..................... 705/26 |
| 2006/0078117 | A1 * | 4/2006 | Pulitzer ......................... 380/211 |

(Continued)

FOREIGN PATENT DOCUMENTS

| JP | 2001268117 | 9/2001 |
| JP | 2004356907 | 12/2004 |
| JP | 2005277925 | 6/2005 |

*Primary Examiner* — Asad Nawaz
*Assistant Examiner* — Stephanie Chang
(74) *Attorney, Agent, or Firm* — Pierce Atwood, LLP; Kevin M. Farrell, Esq.; Robert L. Hover, Esq.

(57) ABSTRACT

The present invention includes both a system and a method for communication over Internet protocol. In its various embodiments, the system and method of the present invention is particularly well suited for communication via VoIP between a user and a recipient, wherein the recipient is a host or a representative of a host. For example, a recipient could be a customer service or client relation's specialist employed by a host company. According to the present invention, the host is responsible for providing communications means to the recipient. In particular, the communications means are embedded within a host web page accessible to the user, such that the user can directly communicate via Internet protocol to a selected recipient or representative of the host.

14 Claims, 5 Drawing Sheets

(56) References Cited

U.S. PATENT DOCUMENTS

| | | | |
|---|---|---|---|
| 2006/0140200 A1* | 6/2006 | Black et al. | 370/401 |
| 2006/0168015 A1* | 7/2006 | Fowler | 709/206 |
| 2006/0282412 A1* | 12/2006 | Getchius | 707/3 |
| 2007/0061174 A1* | 3/2007 | Phillips | 705/5 |
| 2007/0112656 A1* | 5/2007 | Howe et al. | 705/35 |
| 2007/0123223 A1* | 5/2007 | Letourneau et al. | 455/414.1 |
| 2009/0049164 A1* | 2/2009 | Mizuno | 709/223 |
| 2009/0245179 A1* | 10/2009 | Liu et al. | 370/328 |
| 2011/0184746 A1* | 7/2011 | Kwon | 705/1.1 |

\* cited by examiner

SYSTEM AND METHOD FOR VOICE OVER INTERNET PROTOCOL

BACKGROUND OF THE PRESENT INVENTION

1. Field of the Invention

The present invention relates generally to the field of communications, and more specifically to improved systems and methods for communicating through Internet protocol.

2. Summary of the Related Art

With few exceptions, the telecommunications field embraces and indeed encourages the widespread distribution of technology and business capital. A corollary to this proposition is that the costs of telecommuting, whether by telephone, mobile phone or computer, are often borne equally by all parties in roughly equal shares. Thus, most businesses and individuals invest in their own telephones, mobile services, computers and Internet access. In particular, with the advent of Internet protocol and other packet switching technologies, there are a greater number of hubs for communication, and accordingly a greater amount of bandwidth for transmitting information across the world. A primary benefit of packet switching is that a greater volume of information can be transmitted globally as compared to traditional circuit switching communication means. As such, a modest increase in broadband capacity often results in a proportionally large increase in the total volume of information that can be communicated over the new network.

One technology that has been quick to adapt to the spread of broadband and packet switching models is voice over Internet protocol, or VoIP. This service permits users to configure their computers or Internet-accessible devices for receiving analog voice signals and transmitting them across the Internet as digital packets of information. At the receiving end of a voice transmission, the digital packets are received, assembled into the original message, and output to a recipient in the form of an audio signal. In this manner, millions of individuals and businesses are conducting their telephonic business over the Internet as opposed to over analog, circuit switched telephone lines. As broadband access increases, one can reasonably expect that the costs of VoIP access will decrease while the total volume of VoIP users will increase.

Unfortunately, even as the costs of VoIP services decrease, the current business models for generic telecommunications will fail to maintain pace with the growing number of users. The primary issue is that in order to make a telephone call over VoIP, a user must be certain that the intended recipient also has VoIP access, at least until there is technology that permits packet switched information to be carried on circuit switched networks. As expected then, new VoIP customers tend to come in pairs or groups that join collectively to reduce the costs of their common communications. One can conclude therefore that the number of individual users that subscribe to VoIP service is relatively limited, as it makes no sense to be VoIP enabled in a communication vacuum.

Moreover, as VoIP technology is still is its infancy, it has had little to no effect on the business market and traditional mechanisms for doing business. On the one hand, business communications are largely over internal networks, and thus traditional telephones and Internet communications have provided sufficient for the bulk of companies. Likewise, it is reasonable to assume that the bulk of calls received by businesses from third parties are initiated by the latter party, and under most telecommunications plans, one is not charged for incoming communications. As there is usually no increase in marginal cost to the business for communicating with its clients or customers, businesses have had little reason to invest in newer technologies for client development and customer satisfaction.

As VoIP usage increases, however, it can be expected that businesses will begin to utilize it for at least communicating over their internal networks. Likewise, it should be anticipated that in the near future, the bulk of communications would be transmitted over broadband lines, including VoIP communications. It is therefore desirable to enable businesses to more easily utilize data transmission services that utilize broadband and packet switching technologies.

In particular, there is a need in the art for a VoIP service that can be utilized by businesses for both internal communications as well as receiving communications from existing or potential customers. Additionally, there is a need in the art for widely distributing a VoIP service via other means, such as through a business web page, that enables casual web surfers to directly communicate with the owner or representative of the web page. There is a further need in the art for a VoIP service that can be readily distributed through the Internet via its subscribers, i.e. a service that is self-promoting through usage of existing technology such as web pages with embedded software applications. Lastly, there is a need in the art for a VoIP service that distributes the costs of usage to the recipient, in particular in the case of businesses that receive innumerable calls from existing and potential customers and clients.

SUMMARY OF THE PRESENT INVENTION

Accordingly, the present invention includes both a system and a method for communication over Internet protocol. In its various embodiments, the system and method of the present invention is particularly well suited for communication via VoIP between a user and a recipient, wherein the recipient is a host or a representative of a host. For example, a recipient could be a customer service or client relations specialist employed by a host company, such that the host is generally responsible for providing communications means to the recipient.

The system of the present invention includes a host server that is configured for running software for the creation, maintenance and transmission of data representing a web page over Internet protocol. Additionally, the host server further includes communication means, such as VoIP software, which is embedded within the web page software. A user interface is connectable to the host server and includes means for receiving and transmitting data as well as means for displaying the host web page. In particular, the user interface is adapted for operating the communication means embedded in the host web page such that the user can communicate with a designated recipient over Internet protocol. It is a further feature of the system of the present invention that the communication means is provided by the host, i.e. the costs of communication are not distributed to the user. The present invention thus provides a distributable system for VoIP communication between business hosts and users in which the service is freely accessible to the user.

The present invention further includes a method, preferably computer-implemented, for communication over Internet protocol. The method of the present invention includes the steps of loading a host web page, selecting a communication means embedded within the web page, selecting a recipient and initiating communication with the recipient over Internet protocol. Moreover, the method includes steps for determining whether the user interface is adapted for communication over Internet protocol as well as steps for providing the communication means from the host web page to the user at the user's request. Additionally, the method of the present invention includes a system and subsystem of directories and communications channels for selecting a desired recipient as well as the desired form of data to be transferred over Internet protocol, including voice, video, image, text and raw data transfers.

While the system and method of the present invention have been briefly described above, numerous features and advantages of the present invention are readily apparent from the detailed description with reference to the following Figures.

DETAILED DESCRIPTION OF THE PREFERRED EMBODIMENTS

The present invention includes a system 10 and method for communication over Internet protocol, and in particular, the present invention includes a unique a novel means and methodology for utilizing voice over Internet protocol (VoIP) technologies to assist businesses in communicating with their clientele. In its preferred embodiments, the system 10 and method of the present invention include a means for transferring data, including voice data, that is embedded within a software program for displaying a web page. The means for transferring data is preferably a communications package embodied in computer software, as described below.

Unlike existing communications means, however, the present invention contemplates that the data transfer software of the present invention is provided at the initiative and expense of the recipient or host, thus enabling a greater pool of users to communicate with the recipient at their convenience. The utility and benefits of the present invention are apparent from the following description with reference to the figures.

Figure 1:
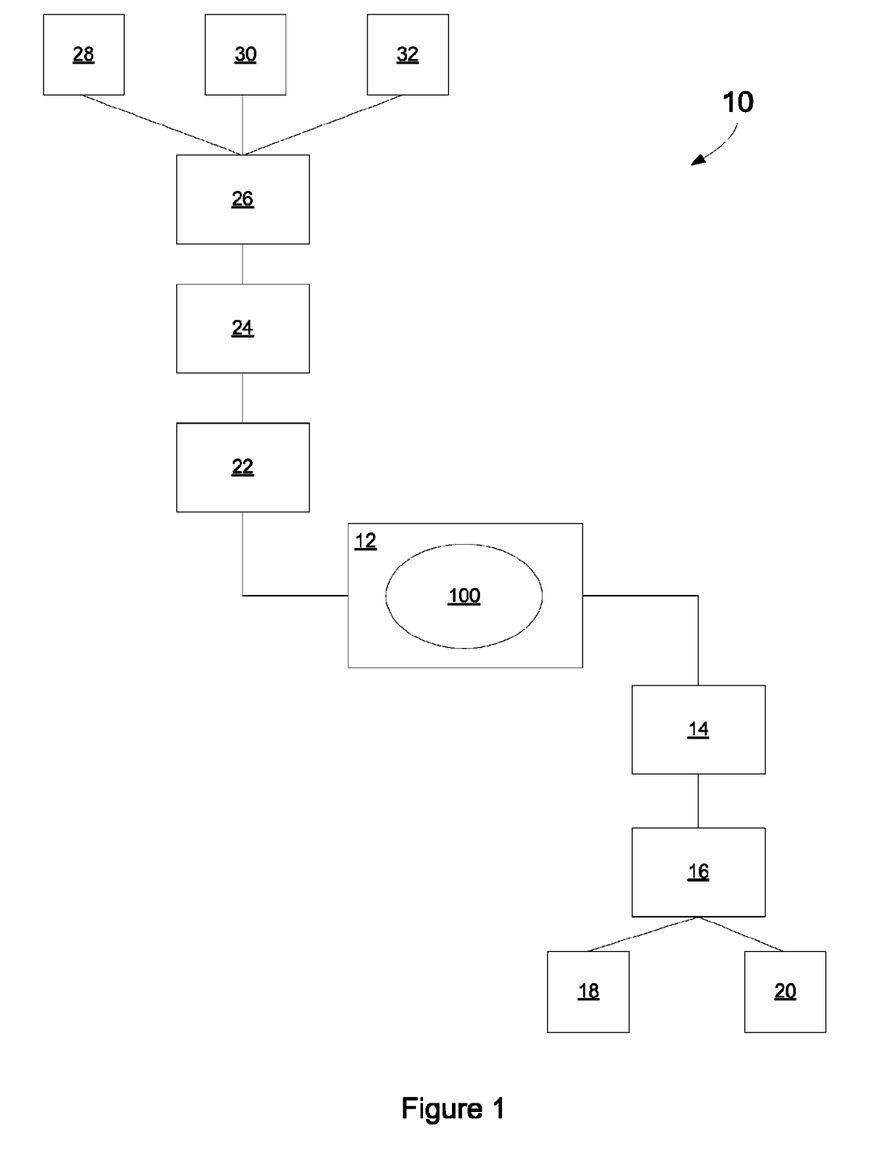
FIG. 1 is a schematic diagram of a system for communication over Internet protocol in accordance with the present invention.

FIG. 1 is a schematic diagram of the system 10 for communication over Internet protocol in accordance with the present invention. The system 10 includes hardware components distributed over a network, such as the Internet. The hardware components interface with software or other means for rendering the system 10 accessible by a plurality of users and adapted for communication with a plurality of recipients.

The system 10 includes a host server 12 that is adapted for running a software application for the creation, storage and transmission of data in a web-page format. Additionally, the host server 12 is configured for running a software service 100 that enables parties to communicate through Internet protocol, such as VoIP software. Accordingly, the system 10 of the present invention utilizes two distinct software applications for communication over Internet protocol. The web-page software is any commercially available software that individuals and businesses use for the creation and posting of a web page on the World Wide Web. The software service 100 is preferably embedded within the web page software such that when a user loads a web page onto his or her Internet browser, the software service 100 is visible to the user and selectable by the user such that the user can communicate with designated recipients affiliated with the web page, i.e. company representatives, customer service, a corporate switchboard or other professionals.

The host server 12 is coupled to, or part of, a host network 14 that connects the host server 12 and its content to a plurality of recipients (not shown) that form the host network 14. It should be understood that the present invention does not require that the host server 12 be in close physical proximity to the bulk of the host network 14 or its constituent parts, i.e. recipients. A preferred recipient will be in possession of certain elements of the system 10, such as a host interface 16 that is connected to a host microphone 18 and a host speaker 20 for enabling the communication of voice data.

The host server 12 is preferably connected to or contained within the host Internet Service Provider (ISP) 22, which is typified by a standard commercial ISP or access provider that are commonly known in the communications fields. The host server 12, and in particular the web-page data it contains, is adapted to be maintained and accessible through the host ISP 22, i.e. the host ISP 22 obtains an Internet protocol IP address for the host web page and makes efforts to ensure that the host web page is accessible to the viewing public. The host ISP 22 is connected to a user ISP 24, which need not be distinct in corporate identity or physical location. For purposes of the present invention, however, the host ISP 22 and the user ISP 24 are the means by which recipients and users can connect and communicate through Internet protocol.

A user interface 26, such as a personal computer adapted for running software such as an Internet browser, is connected to the user ISP 24 through conventional means, preferably including cable modem, DSL and high speed wireless access. In alternate embodiments, the user interface 26 of the present invention also includes laptop computers, personal digital assistants (PDA's), or any other electronic device that is Internet accessible. The user interface 26 is further connected to a user microphone 28, a user speaker 30 and user selection means 32. The user selection means 32 allows the user to interact with the user interface 26. Typically, this interaction is accomplished though a keyboard, mouse, mouse pad, stylus or other conventional means employed with the devices described above. For purposes of the present invention, the user interface 26 includes all means for connecting to the Internet, including analog telephone adapters, IP phones, Wi-Fi phones and the more typical computer-to-computer type connectivity.

Figure 2:
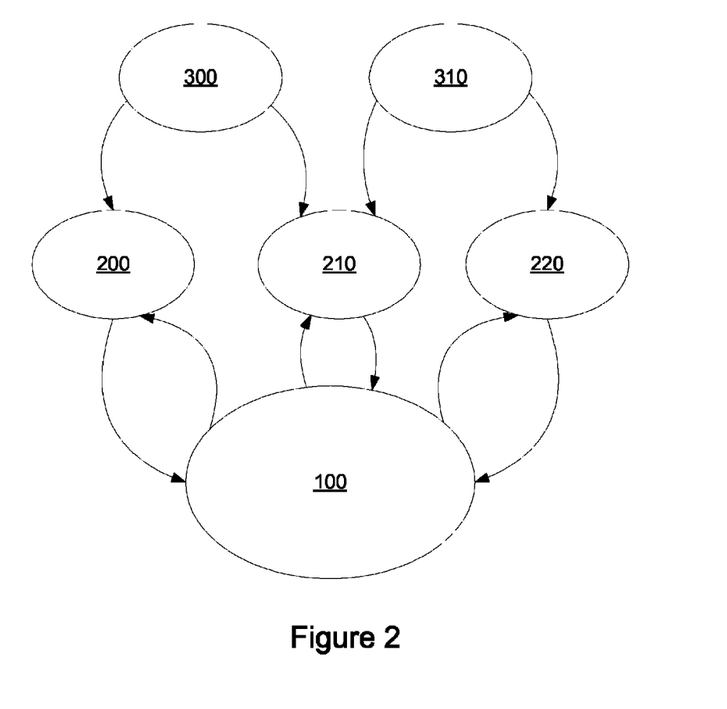
FIG. 2 is a state diagram of the system for communication over Internet protocol in accordance with the present invention.

FIG. 2 is a state diagram of the system 10 for communication over Internet protocol in accordance with the present invention. In its preferred embodiments, the system 10 of the present invention can be described with reference to its operation. The system 10 is represented by the software service 100, wherein the software service 100 enables communication between users and recipients over Internet protocol, and in particular the software service 100 is preferably a VoIP communication channel that both users and recipients to engage in conversation.

As shown in FIG. 2, a group of users 300, 310 is in communication with a group of recipients 200, 210, 220. Each of the recipients 200, 210, 220 has entered into a transaction or agreement in order to purchase the software service 100 and place it on their respective web pages. Accordingly, each of the users 300, 310 can freely communicate with the intended recipient 200, 210, 220 without incurring any cost of his or her own. All of the costs associated with the software service 100 are borne by the recipients 200, 210, 220 such that any incoming communication, be it in the form of voice, video, images, text or raw data, can be freely transmitted by the users 300, 310.

Figure 3:
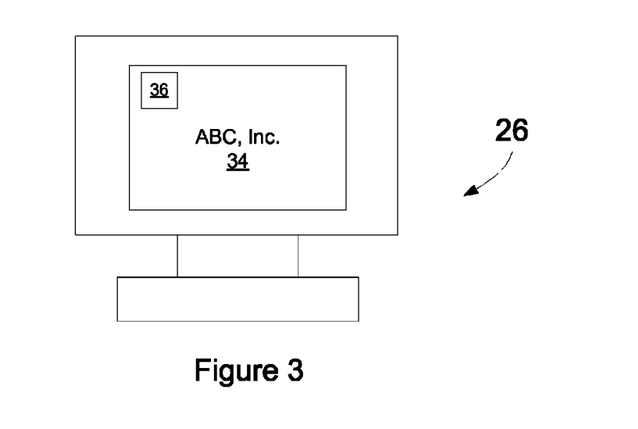
FIG. 3 is a schematic representation of a web-based interface for communication over Internet protocol in accordance with the present invention.

The users can access the software service 100 and thus the system 10 of the present invention through a typical user interface 26, depicted in FIG. 3. As shown, the user interface 26 includes a graphical component for displaying a web page 34 for a sample company, ABC, Inc. According to the present invention, ABC, Inc. has established its web page 34 and it is maintained in concert with the host ISP 22. The web page 24 further includes selection means 36, such as a visual icon, that allows the user to access the software service 100 and hence the system 10 of the present invention. When the user loads the web page 34 of ABC, Inc., he or she is invited to click on or otherwise select the selection means 36 for transmitting data to the recipient, such as for example the customer service unit of ABC, Inc.

Under the current paradigm, users frequently utilize corporate homepages for locating contact information concerning a person or organization. For example, if the user wishes to call ABC, Inc. for any reason, he or she will typically load the ABC, Inc. web page, locate the contact information, and then use his or her telephone or wireless telephone to call the desired recipient. According to the present invention, however, the user no longer needs his or her telephone or wireless phone. On the contrary, with a properly outfitted user interface 26 according to the system 10 of the present invention, the user will simply select the selection means 26 embedded within the ABC, Inc., which will in turn engage the software service 100 described above allowing the user to communicate directly with a desired recipient at ABC, Inc. over Internet protocol.

Figure 4:
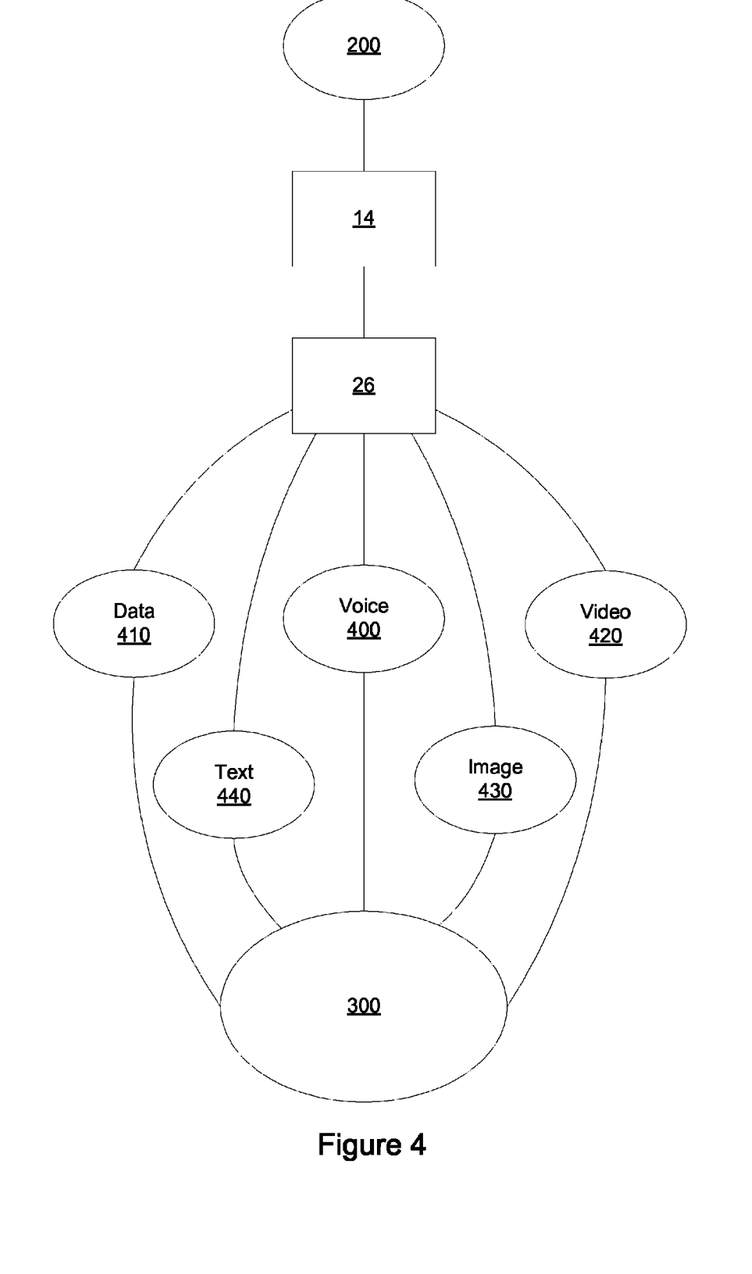
FIG. 4 is a state diagram of the system for communication over Internet protocol in accordance with the present invention.

The communication path is shown schematically in FIG. 4, wherein a typical user 300 is in communication with a typical recipient 200. The hardware that connects the user 300 to the recipient 200 is described in detail with reference to FIG. 1, including both the user interface 26 and the host network 14. According to the present invention, the user may select from varied forms of communication, including but not limited to voice 400, data 410, video 420, images 430 and text 440. In particular, that which the user is communicating is input through known means into the user interface 26, i.e. computer, which then transmits the information to the user network 14 through normal Internet protocol, where after it is assembled and directed to the recipient 200. Thus as noted above, the user 300 can freely elect to call the recipient 200 through the system 10 of the present invention. Unlike the prior art, however, this communication will come at no cost to the user 300 as the recipient 200 is fully responsible for the purchase and maintenance of the software service 100 that enables the present invention.

Figure 5:
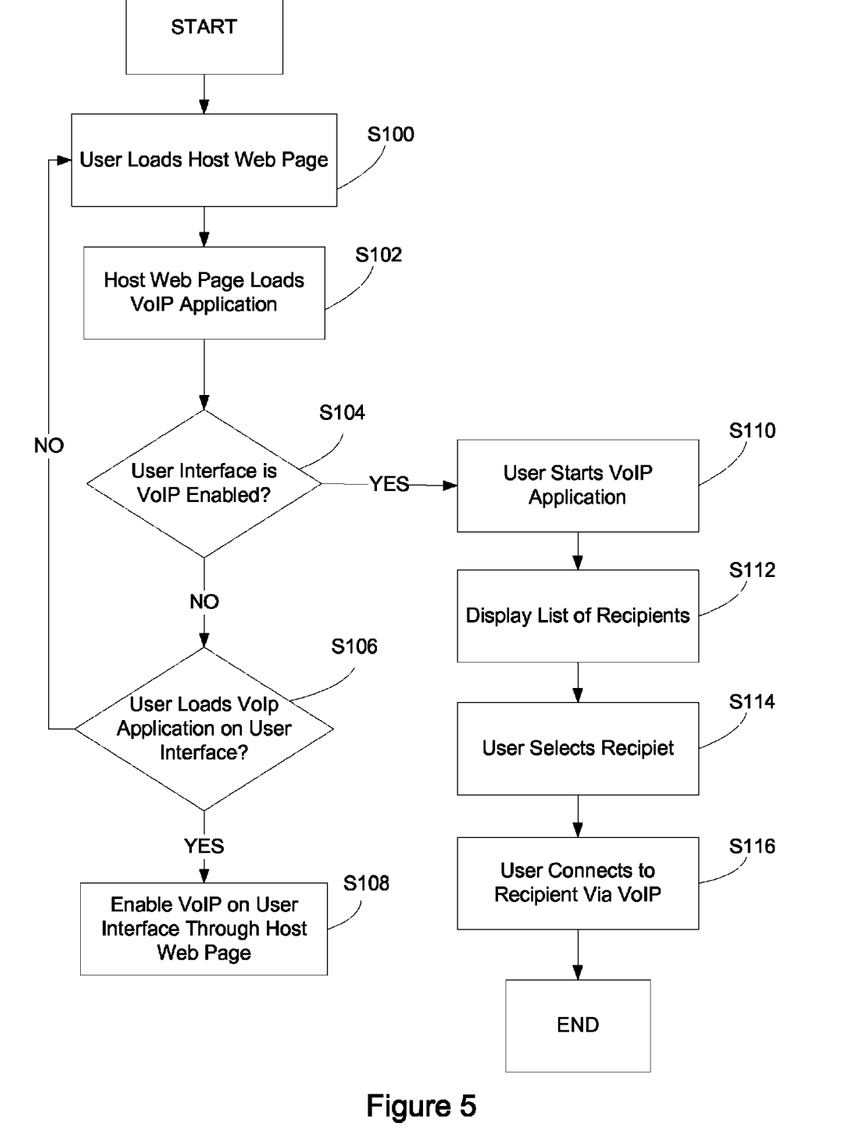
FIG. 5 is a flow chart illustrating a method for communication over Internet protocol in accordance with the present invention.

The present invention further includes a method for communication over Internet protocol, illustrated in the flowchart of FIG. 5. As previously noted, the present invention has utility in the communication of multiple forms of information over Internet protocol. Thus, although the following example specifies the transmission of voice data through VoIP, it should be understood that the following method is no so limited.

In step S100, the user loads the host web page on his or her user interface, as described in detail below. In step S102, the host web page further loads or otherwise begins running the embedded software service, which in this example is specified as a VoIP application. Thus for example, the user's web browser will automatically begin running the embedded VoIP application as it loads the web page on the user interface. In step S104, the software service queries whether the user interface is VoIP enabled, i.e. whether the user interface has the necessary software and hardware to properly utilize the software service and communicate via VoIP.

If the response is affirmative, then the user can select or otherwise start the VoIP application in step S110 using the selection means described above. If the response is negative, then the method proceeds to step S106, in which the user is given the option to download or otherwise install the necessary software service on his or her user interface. Preferably, the software service is accessible via and downloadable from a third party website and server, and preferably the host web page directs the user to that destination in the event that he or she wishes to download the software service. If the user wishes to download the software service, then he or she proceeds to step S108, in which the software is provided to the user and installed on his or her user interface for enabling VoIP access through the host web page. If the user does not wish to download the software service, then he or she is redirected to step S100, in which the host web page is loaded and the user can attempt to contact the host or recipient via conventional means.

If the user opts to install the software service in step S108, then the method directs the user to step S110, in which the user selects or otherwise starts the VoIP application using the selection means described above. Once the VoIP application is running, it displays a list of recipients in step S112, a process that is described in more detail below. In step S114, the user selects the intended recipient from the list provided in step S112. In step S116, the method of the present invention connects the user to the recipient through Internet protocol, at which time the respective parties can transact their business.

Figure 6:
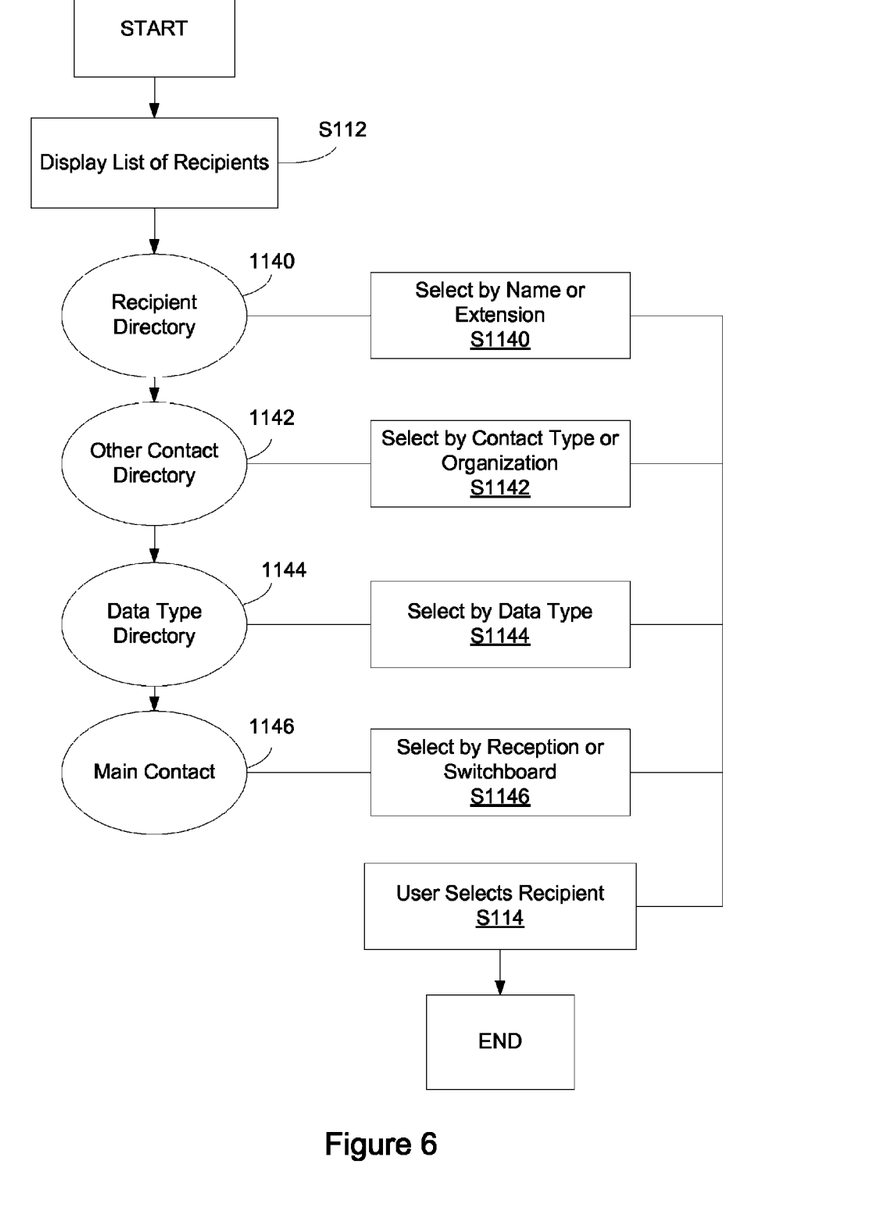
FIG. 6 is a flow chart illustrating a method for selecting a recipient with whom to communicate according to the present invention.

The method of selecting a recipient is shown in the flowchart of FIG. 6. In step S112, noted above, the method displays a list of recipients, which according to the present invention can be embodied through various types of directories. For example, step S112 may display a phone directory 1140, from which the user can select a recipient by name or telephone extension according to step S1140. Alternatively, step S112 may display another contact directory 1142, such as a departmental or service directory. Thus the user can select a contact in step S1142. For example, if the host organization is large, it may wish to provide a contact directory 1142 that has various functional divisions, such as customer service, sales, product help and the like.

Alternatively, a data type directory 1144 may organize its recipients according to data type and communication means, i.e. voice, data, text, video or image. A user can then select a recipient within the host organization based upon the type of data that he or she wishes to communicate in step S1144. For example, if the user is interested in VoIP, then the data type directory 1144 will have a "voice" selection that connects the user to a switchboard. If the user is interested in image or video communication, then the data type directory will have the like selection that connects the user to the proper recipient.

A main contact 1146 can also be incorporated into step S112 providing a user with a generic or representative recipient. In this case, the user will be directed to a receptionist or switchboard according to step S1146, wherein the receptionist or switchboard can be of the human or automated variety. From any of steps S1140, S1142, S1144, or S1146, the method of the present invention proceeds to step S114 wherein the user selects the appropriate recipient. As described above, the host can utilize the present invention to subdivide its directories not only by individual recipients but also by the type of data communicated through Internet protocol.

As described above, the present invention includes both a system and method for communication over Internet protocol. In its preferred embodiments, the system and method include a software service 100 that is purchased by and operated on behalf of a host that in turn is representative of one or more recipients. The system and method of the present invention enable users to access the software service 100 through known and familiar means, i.e. through a host web page that contains the embedded software service 100. In its preferred embodiments described above, the present invention provides an economical means to utilize the scope and power of broadband communications in a manner that does not inhibit customer to business relations. In particular, the present invention makes it easier for businesses to exchange data with their clientele, and it does so in a manner that does not encumber any existing or potential customers.

Although the present invention has been described in detail above, it should be understood that those skilled in the art could readily devise alternative embodiments of the foregoing that do not depart from the scope and spirit of the present invention as defined in the following claims.

I claim:

1. A system for exchanging data comprising:
a host server coupled to a host interface, the host server disposed remotely from a user and including means for displaying data encompassing a host webpage corresponding to the host server, the host server further including means for transferring data automatically to a user loading the host webpage onto a browser of a user interface; and
a software application embedded in the host webpage for coupling the user interface to the means for transferring data;
wherein the software application enables the user to initiate a VoIP communication session directly between the user and the host server via the means for transferring data;
wherein the host automatically, upon execution of the software application, provides a contact directory of a plurality of VoIP recipients employed by the host and displays the contact directory on the host webpage for selection of a VoIP recipient by the user, wherein the contact directory is organized by data type; and
wherein the VoIP communication session is established at no cost to the user.

2. The system of claim 1 wherein the user interface comprises a personal computer.

3. The system of claim 2 wherein the user interface further comprises a microphone for receiving audio signals and a speaker for transmitting audio signals.

4. The system of claim 1 wherein the host interface includes a network adapted for coupling a plurality of VoIP recipients to the user through the host server.

5. The system of claim 1 wherein the host server further comprises routing means for directing data transferred between the user and the host.

6. A method of exchanging data between a user and a VoIP recipient, the method comprising:
establishing a host webpage accessible to the user;
providing a data transfer application embedded within the host webpage, the data transfer application being directly and automatically accessible to the user, at no cost to the user loading host webpage onto a browser, wherein the data transfer application embedded within the host webpage comprises providing a VoIP application for transmitting voice data, automatically providing a contact directory of a plurality of VoIP recipients employed by the host upon execution of the data transfer application, and enabling the user to select a VoIP recipient from among the plurality of VoIP recipients, wherein the contact directory is provided by the host of the host webpage and wherein the contact directory is organized by data type;
receiving VoIP data from the user to the VoIP recipient through the data transfer application; and
transferring VoIP data from the VoIP recipient to the user through the data transfer application.

7. The method of claim 6 wherein the step of providing a data transfer application further comprises the step of the VoIP recipient entering into a transaction with a third-party data transfer provider such that the data transfer application is cost free to the user.

8. The method of claim 6 further comprising the step of determining whether a user interface is enabled with the data transfer application.

9. The method of claim 8 further comprising the step of querying the user whether to enable the user interface with the data transfer application.

10. The method of claim 9 further comprising the step of loading the data transfer application on the user interface in response to the user's request.

11. The method of claim 6 wherein the contact directory is a phone directory of the plurality of VoIP recipients.

12. The method of claim 6 wherein the step of enabling the user to select a VoIP recipient among the plurality of VoIP recipients includes providing a switchboard accessible to the user.

13. The method of claim 6 wherein the step of transferring data from the VoIP recipient to the user through the data transfer application includes transferring text, image, video or voice data.

14. The method of claim 6 further comprising the step of providing a network for connecting the user to a plurality of VoIP recipients.

* * * * *